United States Patent
Peuraniemi et al.

(10) Patent No.: US 8,701,967 B2
(45) Date of Patent: Apr. 22, 2014

(54) METHOD FOR MANUFACTURING A COOLING ELEMENT AND A COOLING ELEMENT

(75) Inventors: Esa Peuraniemi, Vammala (FI); Kai Seppälä, Espoo (FI); Mikael Jåfs, Espoo (FI)

(73) Assignee: Outotec Oyj, Espoo (FI)

( * ) Notice: Subject to any disclaimer, the term of this patent is extended or adjusted under 35 U.S.C. 154(b) by 49 days.

(21) Appl. No.: 13/001,625

(22) PCT Filed: Jun. 30, 2009

(86) PCT No.: PCT/FI2009/050593
§ 371 (c)(1),
(2), (4) Date: Dec. 28, 2010

(87) PCT Pub. No.: WO2010/000940
PCT Pub. Date: Jan. 7, 2010

(65) Prior Publication Data
US 2011/0127020 A1    Jun. 2, 2011

(30) Foreign Application Priority Data
Jun. 30, 2008  (FI) ..................................... 20085671

(51) Int. Cl.
*B23K 20/08* (2006.01)

(52) U.S. Cl.
USPC ........ 228/107; 228/170; 228/174; 228/262.6; 428/544

(58) Field of Classification Search
None
See application file for complete search history.

(56) References Cited

U.S. PATENT DOCUMENTS

| | | | | |
|---|---|---|---|---|
| 2,412,886 | A | * | 12/1946 | Lawson et al. ................. 122/493 |
| 3,137,937 | A | * | 6/1964 | Holtzman et al. ............. 228/108 |
| 3,434,197 | A | * | 3/1969 | Davenport ..................... 228/107 |
| 3,583,064 | A | * | 6/1971 | Costello ........................ 228/107 |
| 3,735,476 | A | | 5/1973 | Deribas et al. |
| 3,740,826 | A | * | 6/1973 | Baba .............................. 228/107 |
| 3,813,758 | A | * | 6/1974 | Araki ............................. 228/108 |

(Continued)

FOREIGN PATENT DOCUMENTS

| | | |
|---|---|---|
| JP | 53-045626 A | 4/1978 |
| JP | 4-353390 A | 12/1992 |

(Continued)

OTHER PUBLICATIONS

Derwent-ACC-No. 1980-68978C which corresponds to SU-429690 (published 1980).*

(Continued)

*Primary Examiner* — Kiley Stoner
(74) *Attorney, Agent, or Firm* — Buchanan Ingersoll & Rooney PC

(57) ABSTRACT

A method for coating the base element of a cooling element used in connection with a metallurgical furnace or the like, said base element being mainly made of copper, at least partly with a metal coating involves a step wherein the metal coating is explosion welded to the base element of a cooling element mainly made of copper. A cooling element, particularly to be used in connection with metallurgical furnaces or the like, includes a base element mainly made of copper, in which base element there is arranged a cooling water channel system, said base element of the cooling element being at least partly coated with a metal coating. The metal coating is explosion welded to the base element that is mainly made of copper.

19 Claims, 2 Drawing Sheets

(56) References Cited

U.S. PATENT DOCUMENTS

Figure 1:
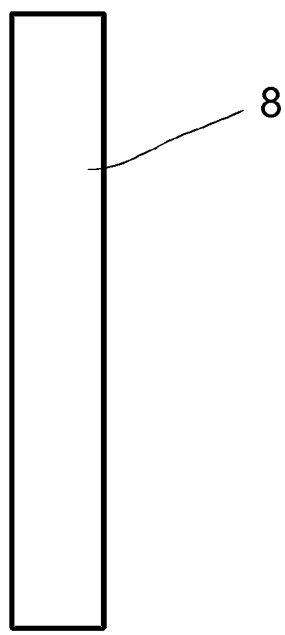

| | | | |
|---|---|---|---|
| 4,455,733 A | | 6/1984 | Smith et al. |
| 4,485,960 A | * | 12/1984 | Sagan et al. ............ 228/107 |
| 4,612,259 A | * | 9/1986 | Ueda ...................... 428/661 |
| 4,842,182 A | * | 6/1989 | Szecket ................... 228/108 |
| 4,844,321 A | * | 7/1989 | Matsuzawa et al. ...... 228/107 |
| 5,027,891 A | * | 7/1991 | Fulford et al. .......... 165/104.14 |
| 5,435,058 A | * | 7/1995 | Breit et al. ............... 29/854 |
| 5,470,012 A | | 11/1995 | Linse et al. |
| 6,371,900 B1 | * | 4/2002 | Kurisu et al. ............ 492/46 |
| 6,749,101 B1 | * | 6/2004 | Lee et al. ................. 228/107 |
| 6,843,958 B1 | * | 1/2005 | Korbik et al. ............ 266/194 |
| 2004/0051218 A1 | | 3/2004 | Saarinen |
| 2004/0129560 A1 | * | 7/2004 | Wickersham, Jr. ...... 204/298.13 |
| 2004/0200419 A1 | | 10/2004 | Mauck et al. |
| 2008/0086033 A1 | * | 4/2008 | Mihalca .................. 600/160 |
| 2010/0012501 A1 | | 1/2010 | Saarinen et al. |

FOREIGN PATENT DOCUMENTS

| | | |
|---|---|---|
| JP | A-2004-516441 | 6/2004 |
| JP | A-2004-224642 | 8/2004 |
| JP | A-2010-505082 | 2/2010 |
| WO | WO 81/03221 A1 | 11/1981 |
| WO | WO 02/37044 A1 | 5/2002 |
| WO | WO 2008/037836 A1 | 4/2008 |

OTHER PUBLICATIONS

International Search Report (PCT/ISA/210) issued on Oct. 27, 2009, by Finnish Patent Office as the International Searching Authority for International Application No. PCT/FI2009/050593.

International Preliminary Report on Patentability (PCT/IPEA/409) issued on Sep. 28, 2010, by Finnish Patent Office for International Application No. PCT/FI2009/050593.

Finnish Search Report issued on Feb. 9, 2009 (with English language translation of category of cited documents).

English translation of Chinese Office Action dated Dec. 31, 2012, issued in corresponding Chinese Patent Application No. 20098012782.7.

Jul. 12, 2013 Japanese Office Action issued in Japanese Patent Application No. 2011-515509.

Extended Search Report issued in corresponding Application No. EP 09 77 2627 dated Feb. 19, 2014.

* cited by examiner

400
METHOD FOR MANUFACTURING A COOLING ELEMENT AND A COOLING ELEMENT

BACKGROUND OF INVENTION

The invention relates to a method according to the preamble of claim 1 for coating the base element of a cooling element used in connection with a metallurgic furnace or the like, said base element being mainly made of copper, at least partly with a metal coating wherein in said cooling element is arranged a cooling water channel system.

The invention also relates to a cooling element according to the preamble of claim 11, particularly to be used in connection with metallurgical furnaces or the like, which cooling element comprises a base element mainly made of copper, in which base element there is arranged a cooling water channel system, said base element of the cooling element being at least partly coated with a metal coating.

From the publication WO 02/37044 there is known a cooling element, particularly to be used in connection with metallurgical furnaces or the like, said cooling element comprising a base element, in which there is arranged a cooling water channel system for the cooling water. At least part of that surface of the cooling element that may get into contact with molten metal is made of steel.

BRIEF DESCRIPTION OF INVENTION

An object of the invention is to realize a method for coating the base element of a cooling element, provided with a cooling water channel system, to be used in connection with a metallurgical furnace or the like, said base element being mainly made of copper, at least partly with a metal coating, so that there is obtained a cooling element where the thermal contact between the base element and the metal coating is better than in the prior art arrangements.

The object of the invention is achieved by a method according to the independent claim 1 for coating the base element of a cooling element, provided with a cooling water channel system, to be used in connection with a metallurgical furnace or the like, said base element being mainly made of copper, at least partly with a metal coating.

Preferred embodiments of the method according to the invention are set forth in the dependent claims 2-10.

The invention also relates to a cooling element according to the independent claim 11, particularly to be used in connection with metallurgical furnaces or the like, said cooling element comprising a base element mainly made of copper, in which base element there is arranged a cooling water channel system, said cooling element being at least partly coated with a metal coating.

Preferred embodiments of the cooling element according to the invention are set forth in the dependent claims 12-19.

By explosion welding a metal coating to the base element, there is achieved a joint between the base element and the metal coating, said joint having particularly good capacities for transferring thermal energy between the base element and the metal coating. By explosion welding, there is preferably, but not necessarily, achieved a metallurgical joint between the base element and the metal coating.

In a preferred embodiment of the method according to the invention, the cooling water channel system is machined at least partly by drilling holes from outside the base element, so that on the surface of the base element, there are created holes. In this preferred embodiment, at least part of the holes are plugged at least partly by a plug, which is fitted in the hole on the level of the outer surface of the base element, so that the holes drilled in the base element form at least part of the cooling water channel system. In this preferred embodiment, the base element is coated with a metal coating at the plugs by explosion welding, so that the metal coating at least partly covers the plugs fitted in the holes.

In a preferred embodiment of the method according to the invention, there is made a metal coating, the thickness of which is less than 100 mm, advantageously roughly 1-roughly 20 mm thick, preferably roughly 10 mm thick.

In a preferred embodiment of the method according to the invention, a cooling element is manufactured by first casting a base billet mainly made of copper, which base billet is coated at least partly by explosion welding a metal coating to the base billet, so that there is obtained a base billet provided with a metal coating. The base billet provided with a metal coating is machined so that the cooling element obtains its final shape; and the cooling element is provided with possibly required tube joints for conducting the cooling water circulation flow to the cooling water channel system of the cooling element.

In a preferred embodiment of the method according to the invention, the metal coating is made of stainless steel, with a chromium content of over 10.5%, advantageously of fireproof stainless steel according to the standard EN 10095 (Fireproof steels and nickel alloys).

In a preferred embodiment of the method according to the invention, the metal coating is made of stainless steel, with a chromium content of the order 17-30%, such as 22-24%, 24-28% or 29-30%.

In a preferred embodiment of the method according to the invention, the metal coating is made of nickel alloy.

In a preferred embodiment of the method according to the invention, the metal coating is made of lead alloy.

In a preferred embodiment of the method according to the invention, the metal coating is coated at least partly with a ceramic lining.

In a preferred embodiment of the method according to the invention, there is coated, at least partly with a metal coating, that surface of the base element that during the use of the cooling element is turned to face the molten metal placed in a metallurgical furnace or the like.

LIST OF DRAWINGS

Figure 2:
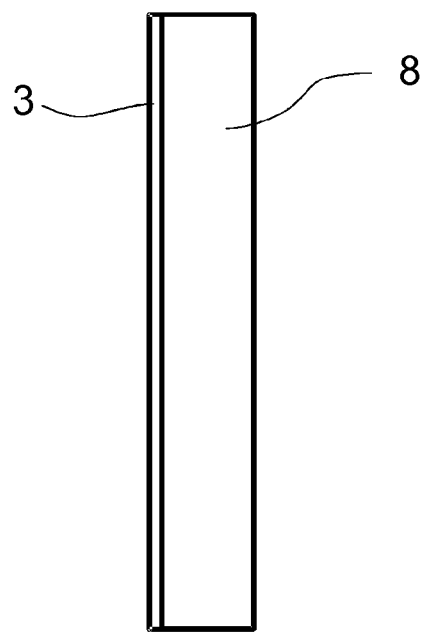
Figure 3:
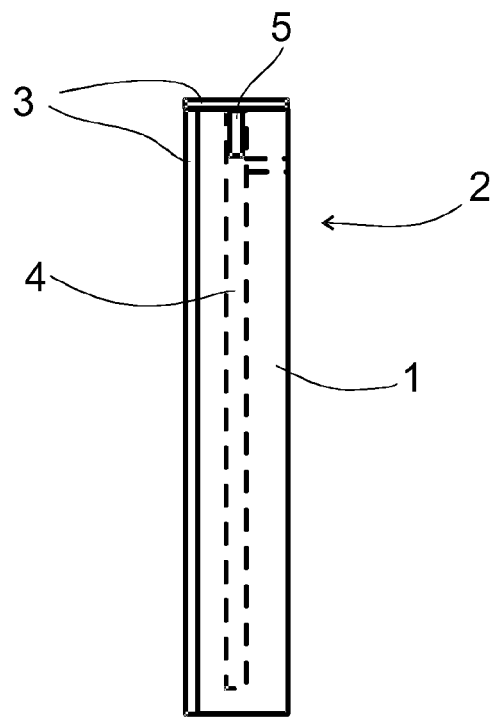
Figure 4:
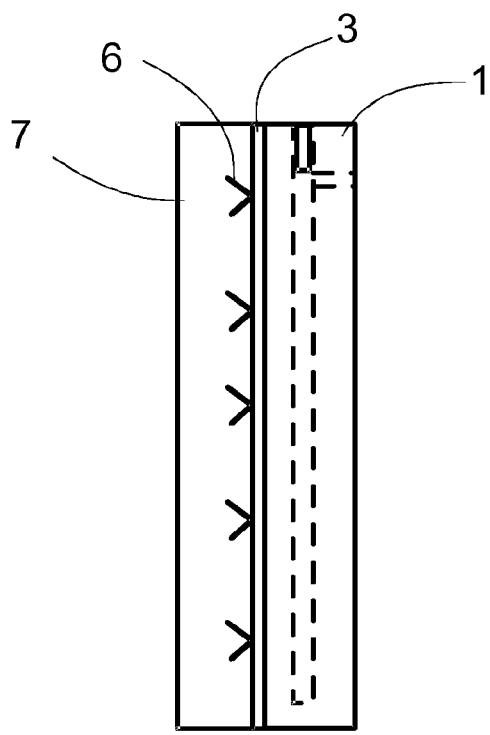

A few preferred embodiments of the invention are described in more detail below, with reference to the appended drawings, where FIG. 1 is an exploded side-view illustration of a base billet, FIG. 2 is an exploded side-view illustration of a base billet provided with metal coating, FIG. 3 is an exploded side-view illustration of a cooling element, and FIG. 4 is an exploded side-view illustration of a cooling element provided with ceramic lining.

DETAILED DESCRIPTION OF INVENTION

The drawing shows an exploded view of a cooling element comprising a base element 1 mainly made of copper. In the base element 1, there is arranged a cooling water channel system 2. The base element 1 of the cooling element is at least partly coated with a metal coating 3.

The method according to the invention and preferred embodiments of the method according to the invention are described in more detail below.

In the method according to the invention for coating the base element of a cooling element 1 to be used in connection with a metallurgical furnace or the like, said cooling element being mainly made of copper, at least partly with a metal coating 3, the metal coating 3 is explosion welded to the cooling element that is mainly made of copper.

The method according to the invention comprises preferably, but not necessarily, a step where the base element 1 is provided with a cooling water channel system 2, at least partly by drilling holes 4 from outside the base element 1, so that on the surface of the base element 1 there are created holes 4, i.e. so that a hole 4 extends to the surface of the base element 3. Now at least part of the holes are plugged at least partly by a plug 5, which is fitted in the hole on the level of the outer surface of the base element 1, so that the holes drilled in the base element 1 form at least part of the cooling water channel system 2 of the cooling element. Now the base element 1 is preferably, but not necessarily, coated with a metal coating 3 at the plugs 5 by explosion welding, so that the metal coating 3 at least partly covers the plugs 5 fitted in the holes 4.

In the method according to the invention, in the base element 1 there is provided, advantageously by explosion welding, a metal coating 3, the thickness of which is less than 100 mm, advantageously roughly 1-roughly 20 mm, preferably roughly 10 mm.

In the method according to the invention, the cooling element is manufactured preferably, but not necessarily, so that first there is cast a base billet 8 mainly made of copper, as is illustrated in FIG. 1. Thereafter said base billet 8 is coated by explosion welding the metal coating 3 to the base billet mainly made of copper, so that there is obtained a base billet provided with a metal coating 3, as is illustrated in FIG. 2. Next said base billet 8 provided with a metal coating 3 is machined so that the cooling element obtains its final shape, and the cooling element is provided with possibly required tube joints for conducting the cooling water circulation flow to the cooling water channel system 2 of the cooling element, as is illustrated in FIG. 3.

The metal coating 3 is preferably, but not necessarily, made at least partly of stainless steel, with a chromium content of over 10.5%, advantageously of fireproof stainless steel according to the standard EN 10095(Fireproof steels and nickel alloys).

For instance, the metal coating 3 can be made at least partly of stainless steel, with a chromium content of the order 17-30%, such as 22-24%, 24-28% or 29-30%. In case the metal coating 3 is at least partly made of steel, the steel is preferably, but not necessarily, at least either stainless steel, acid-proof steel, heat resisting steel, or fireproof steel. As an alternative or in addition, the metal coating 3 can be made at least partly of nickel or lead, or of a nickel or lead alloy.

In the method, the metal coating 3 is preferably, but not necessarily, provided with connecting anchors 6 for the ceramic lining 7.

The metal coating 3 is preferably, but not necessarily, coated with a ceramic lining 7.

In the method, there is coated with a metal coating 3 at least partly, advantageously essentially completely, that surface of the base element 1 that during the use of the cooling element is turned to face the molten metal placed in a metallurgical furnace or the like.

The cooling element according to the invention, as well as a few preferred embodiments of the cooling element according to the invention, are described in more detail below.

A cooling element according to the invention comprises a base element 1 mainly made of copper, in which base element 1 there is arranged a cooling water channel system 2. The base element of the cooling element 1 is at least partly coated with a metal coating 3, which is explosion welded to the base element 1 of the cooling element, said base element being mainly made of copper.

The cooling water channels 2 are preferably, but not necessarily, machined at least partly by drilling holes 4 in the base element 1 from outside the base element, so that on the surface of the base element 1, there are created holes 4. Now at least part of the holes are plugged at least partly by plugs 5, which are fitted in the holes 4 on the level of the outer surface of the base element 1, so that the holes drilled in the base element 1 form at least part of the cooling water channel system 2. Thus the base element 1 is preferably, but not necessarily, coated with a metal coating 3 at the plugs 5 by explosion welding, so that the metal coating 3 at least partly covers the plugs 5 fitted in the holes 4.

The thickness of the metal coating 3 is preferably, but not necessarily, less than 100 mm, advantageously roughly 1-roughly 20 mm, preferably roughly 10 mm.

The cooling element is preferably, but not necessarily, manufactured so that first there is cast a base billet 8 mainly made of copper. Thereafter said base billet 8 is coated by explosion welding the metal coating 3 to the base billet 8 mainly made of copper, so that there is obtained a base billet 8 provided with a metal coating 3. Next the base billet 8 provided with a metal coating 3 is machined, so that the cooling element has obtained its final shape, and the cooling element is provided with possibly required tube joints for conducting the cooling water circulation flow to the cooling water channel system 2 of the cooling element.

The metal coating 3 is preferably, but not necessarily, made at least partly of stainless steel, with a chromium content of over 10.5%, advantageously of fireproof stainless steel according to the standard EN 10095 (Fireproof steels and nickel alloys).

For instance, the metal coating 3 can be made at least partly of stainless steel, with a chromium content of the order 17-30%, such as 22-24%, 24-28% or 29-30%. In case the metal coating 3 is made at least partly of steel, the steel is preferably, but not necessarily, at least either stainless steel, acid-proof steel, heat resisting steel, or fireproof steel. As an alternative or in addition, the metal coating 3 can be made at least partly of nickel or lead, or of a nickel or lead alloy.

The metal coating 3 is preferably, but not necessarily, provided with connecting anchors 6 or with other fastening elements for the ceramic lining 7.

The metal coating 3 is preferably, but not necessarily, coated with a ceramic lining 7.

At least that surface of the base element 1 that during the use of the cooling element is turned to face the molten metal placed in a metallurgical furnace or the like is preferably, but not necessarily, at least partly coated with a metal coating 3.

For a man skilled in the art, it is obvious that along with the development of technology, the basic idea of the invention can be realized in many different ways. Thus the invention and its preferred embodiments are not restricted to the examples described above, but they can vary within the scope of the appended claims.

The invention claimed is:

1. A method for manufacturing a cooling element for a metallurgical furnace, wherein said method comprises the steps of:
   providing a base element that is substantially made of copper, includes a cooling water channel system in said base element, and includes a surface, and
   forming a metal coating on said surface of said base element by explosion welding, wherein the cooling water channel system is machined at least partly by drilling holes from outside the base element, so that there are holes on the surface of the base element, at least some of the holes are plugged at least partly by a plug, which is fitted in a hole on the level of the outer surface of the base element, so that the holes drilled in the base element form at least part of the cooling water channel system, and the base element is coated with the metal coating at the plugs by explosion welding, so that the metal coating at least partly covers the plugs fitted in the holes.

2. A method according to claim 1, wherein the metal coating has a thickness of less than 100 mm.

3. A method according to claim 1, wherein
the cooling element is manufactured by first casting a base billet mainly made of copper,
the base billet is coated at least partly by explosion welding the metal coating to the base billet, so that there is obtained the base billet provided with the metal coating, and
the base billet provided with the metal coating is machined so that the cooling element obtains its final shape.

4. A method according to claim 1, wherein the metal coating comprises stainless steel having a chromium content greater than 10.5%.

5. A method according to claim 1, wherein the metal coating comprises stainless steel having a chromium content of about 17-30%.

6. A method according to claim 1, wherein the metal coating comprises nickel or lead, or a nickel or lead alloy.

7. A method according to claim 1, wherein the metal coating is provided with connecting anchors for the ceramic lining.

8. A method according to claim 1, wherein the metal coating is coated at least partly with a ceramic lining.

9. A method according to claim 1, wherein the metal coating is placed on a portion of the surface of the base element that during the use of the cooling element is turned to face the molten metal placed in a metallurgical furnace.

10. A cooling element for a metallurgical furnace, wherein said cooling element comprises a base element that is substantially made of copper and that is provided with a cooling water channel system in said base element, wherein said base element has a surface,
wherein said surface is at least partly coated with a metal coating, and wherein said metal coating is explosion welded to said base element and
wherein the cooling water channel system is machined at least partly by drilling holes from outside the base element, so that on the surface of the base element there are created holes, at least some of the holes are plugged at least partly by plugs, which are fitted in the drilled holes on the level of the outer surface of the base element, so that the holes drilled in the base element form at least part of the cooling water channel system, and the base element is coated with the metal coating at the plugs by explosion welding, so that the metal coating at least partly covers the plugs fitted in the holes.

11. A cooling element according to claim 10, wherein the thickness of the metal coating is less than 100 mm.

12. A cooling element according to claim 10, wherein the metal coating comprises stainless steel, with a chromium content of over 10.5%.

13. A cooling element according to claim 10, wherein the metal coating comprises stainless steel, with a chromium content of about 17-30%.

14. A cooling element according to claim 10, wherein the metal coating comprises nickel or lead or a nickel or lead alloy.

15. A cooling element according to claim 10, wherein the metal coating is provided with connecting anchors for the ceramic lining.

16. A cooling element according to claim 10, wherein the metal coating is at least partly coated with a ceramic lining.

17. A cooling element according to claim 10, wherein at least that surface of the base element that during the use of the cooling element is turned to face the molten metal placed in a metallurgical furnace is at least partly coated with a metal coating.

18. A method for manufacturing a cooling element for a metallurgical furnace, wherein said method comprises the steps of:
providing a base element that is substantially made of copper, includes a cooling water channel system in said base element, and includes a surface, and
forming a metal coating by explosion welding on said surface of said base element,
wherein the metal coating is coated at least partly with a ceramic lining, and
wherein the metal coating is provided with connecting anchors for the ceramic lining.

19. A cooling element for a metallurgical furnace, wherein said cooling element comprises a base element that is substantially made of copper and that is provided with a cooling water channel system in said base element, wherein said base element has a surface, wherein said surface is at least partly coated with a metal coating, wherein said metal coating is explosion welded to said base element, wherein the metal coating is at least partly coated with a ceramic lining, and wherein the metal coating is provided with connecting anchors for the ceramic lining.

* * * * *